United States Patent
Zheng (10) Patent No.: US 11,882,213 B2
(45) Date of Patent: Jan. 23, 2024

(54) METHOD FOR KEY GENERATION UPON REQUEST BY A SECURE ACCESS DEVICE, USING AN ELECTRONIC CONTROL UNIT OF A VEHICLE

(71) Applicant: Robert Bosch GmbH, Stuttgart (DE)

(72) Inventor: Liang Zheng, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 17/219,529

(22) Filed: Mar. 31, 2021

(65) Prior Publication Data

US 2021/0314151 A1 Oct. 7, 2021

(30) Foreign Application Priority Data

Apr. 1, 2020 (CN) .......................... 202010251565.2

(51) Int. Cl.
*H04L 9/08* (2006.01)
*G07C 5/00* (2006.01)
*G07C 5/08* (2006.01)

(52) U.S. Cl.
CPC ............ *H04L 9/0861* (2013.01); *G07C 5/008* (2013.01); *G07C 5/0808* (2013.01); *H04L 9/0822* (2013.01); *H04L 9/0894* (2013.01); *H04L 2209/24* (2013.01); *H04L 2209/84* (2013.01)

(58) Field of Classification Search
CPC ... H04L 9/0861; H04L 9/0822; H04L 9/0894; H04L 2209/24; H04L 2209/84; G07C 5/008; G07C 5/0808
USPC ........................................................ 380/284
See application file for complete search history.

(56) References Cited

U.S. PATENT DOCUMENTS

| | | | | |
|---|---|---|---|---|
| 2013/0111582 A1* | 5/2013 | Forest | ..................... | G06F 21/44 726/19 |
| 2016/0099806 A1* | 4/2016 | Racklyeft | ............. | H04W 12/08 380/281 |
| 2018/0254903 A1* | 9/2018 | Bardelski | .............. | H04L 9/0894 |
| 2019/0245691 A1* | 8/2019 | Takemori | .............. | H04L 9/0822 |

FOREIGN PATENT DOCUMENTS

| | | |
|---|---|---|
| CN | 103685214 A | 3/2014 |
| CN | 108989024 A | 12/2018 |
| EP | 3913880 A1 * | 11/2021 ......... H04L 63/0435 |

\* cited by examiner

*Primary Examiner* — Bryan F Wright
(74) *Attorney, Agent, or Firm* — Maginot, Moore & Beck LLP (57) ABSTRACT

A vehicle-mounted key-generation method is for a vehicle including electronic control units (ECUs) that communicate with each other via a vehicle-mounted network. At least one ECU includes a key generation module and a key transmission module, and each of the other ECUs includes a key receiving module and a key invoking module. The method includes receiving, through at least one ECU, a secure access request sent from an authorized user through a secure access device, and, after confirming to accept the secure access request from the secure access device, waiting for the secure access device to send a key generation request. The method further includes, after receiving the key generation request, generating a key through the key generation module, using the key transmission module to send the key to other ECUs via the vehicle-mounted network, and receiving the key through the key receiving module in other ECUs.

18 Claims, 4 Drawing Sheets

METHOD FOR KEY GENERATION UPON REQUEST BY A SECURE ACCESS DEVICE, USING AN ELECTRONIC CONTROL UNIT OF A VEHICLE

This application claims priority under 35 U.S.C. § 119 to patent application no. CN 2020 1025 1565.2, filed on Apr. 1, 2020 in China, the disclosure of which is incorporated herein by reference in its entirety.

The present disclosure in general relates to vehicle mounted electronic control systems, and more particular to a vehicle mounted key generation method, a vehicle and a computer-readable storage medium using said method.

BACKGROUND

In motor vehicles, multiple electronic control units (ECUs) are usually configured to control the operation of various systems in the vehicle, such as the power system, climate control system, infotainment system, body system, chassis system, and other systems. The multiple ECUs usually communicate via a control area network (CAN) set up in the vehicle to exchange the required data information.

In the traditional communication using a CAN, the ECU as the sender sends data packets to the CAN bus in the form of plaintext broadcast, and the ECU as the receiver receives the plaintext of the data through the CAN bus. This kind of plaintext-based data transmission on the CAN bus is easily intercepted and analyzed by a third party, who may even forge and send some control information, causing the ECU to perform some unsafe actions and threatening safety of the vehicle during traveling. Particularly for ECUs which are involved in driving safety and control functions such as the engine, accelerator, brake, etc., the security level of their control information is required to a higher safety level.

In order to improve the security level of vehicle mounted communication systems and prevent cracking of and attacks on vehicle mounted communication systems, Chinese Disclosure Patent Application CN108989024A proposes a method for controlling the communication among electronic control units (ECUs) in vehicles, wherein each ECU has been pre-configured with a root key, which can be used to encrypt a first message used to exchange keys among ECUs, thereby improving the encryption security of the in-vehicle communication system. Specifically, the root key in each ECU is configured for the vehicle by the vehicle manufacturer during, for example, the vehicle production stage. For example, the manufacturer generates and configures a root key corresponding to the vehicle model through a costly server configured and stores the root key in the memory of each ECU in the vehicle. The root keys configured for each ECU match each other. In other words, if the root key configured for any of the ECUs changes, the root keys configured for the other ECUs associated with the ECU need to be adjusted accordingly to achieve a new match. Otherwise, these ECUs will not work properly in coordination.

At present, the Autosar 4.3.1 specification for secure vehicle mounted communication that most vehicle manufacturers are based on does not define a unified method for generating keys, and therefore different vehicle manufacturers configure keys for vehicle ECUs in different ways in the vehicle production stage.

During the use of a vehicle, due to various reasons, for example, when an ECU of the vehicle is repaired or replaced or an ECU of the vehicle is maliciously attacked, the key configured in the ECU of the vehicle needs to be replaced. In this scenario, the party performing the replacement operation needs to connect to the remotely located vehicle manufacturer's server (which configured the key for the vehicle ECU in the vehicle production stage) via the Internet, so that the server can generate a key for the relevant ECU. At this point, if the conditions to connect to the vehicle manufacturer's server are not met or the communication with the vehicle manufacturer's server is not smooth, it will not be possible to update the key in time.

Moreover, during inspection or regular maintenance of a vehicle, the maintenance personnel of the repair shop may find that one or more ECUs in the vehicle need to be replaced, and the key configured in the new ECU after replacement may not match the keys configured in other ECUs of the vehicle. In this regard, if the maintenance personnel are unable to connect to the remotely located server of the vehicle manufacturer (which configured a key for the vehicle ECU in the vehicle production stage) via the Internet so that the server can be used to generate a full set of matching keys for the other ECUs related to the new ECU in the vehicle under maintenance and the maintenance personnel can replace the keys for these related ECUs, the maintenance personnel usually have to replace all the related ECUs on the vehicle under maintenance to ensure these ECU keys match each other, resulting in a substantial increase in vehicle maintenance costs.

In consideration of the above, the following problems in prior art have been observed that are not easily noticeable by those skilled in the art and has thought about their improvements:

(1) during the production stage at the vehicle manufacturer, the vehicle manufacturer needs to configure a costly server in order to generate the keys required for vehicle ECUs;

(2) in the absence of the conditions for connecting to the vehicle manufacturer's server or poor communication with the vehicle manufacturer's server, a vehicle maintenance provider will not be able to flexibly update a vehicle's ECUs in a timely manner;

(3) during the maintenance of a vehicle at the repair shop, when one or more ECUs of the vehicle need to be replaced, the repair shop usually needs to replace the full set of the associated ECUs, resulting in unreasonably high vehicle repair costs;

(4) the key exchanged among the ECUs of a vehicle needs to be encrypted, resulting in high cost and complexity of key exchange.

SUMMARY

The present disclosure is proposed in view of observation of the above-mentioned problems in prior art and after associated reflection.

One purpose of the present disclosure is to provide a vehicle mounted key generation method, a vehicle using the method, and a computer-readable storage medium, so that vehicle manufacturers do not need to configure a dedicated server for the keys required for vehicle ECUs, thereby significantly reducing hardware configuration cost of vehicle manufacturers.

Another purpose of the present disclosure is to provide a vehicle mounted key generation method, a vehicle using the method, and a computer-readable storage medium, so that the vehicle manufacturer's server does not need to be connected to replace the key of a vehicle ECU, thereby significantly improving flexibility in updating the keys of vehicle ECUs while ensuring security in the generation and transmission of the keys required for vehicle ECUs.

Another purpose of the present disclosure is to provide a vehicle mounted key generation method, a vehicle using the method, and a computer-readable storage medium, so that vehicle repair shops do not need to replace a full set of vehicle ECUs in order to ensure the keys configured for different ECUs match each other after maintenance of a vehicle, thereby remarkably reducing the maintenance costs during the use of vehicles.

Another purpose of the present disclosure is to provide a vehicle mounted key generation method, a vehicle using the method, and a computer-readable storage medium, so that the key exchange between vehicle ECUs does not need to be encrypted, whereby reducing the complexity of the operation of key exchange among vehicle ECUs.

According to the first aspect of the present disclosure, a vehicle mounted key generation method used for vehicles is provided, the vehicle comprising a plurality of electronic control units (ECUs) that communicate with each other via a vehicle-mounted network, wherein at least one ECU comprises a key generation module and a key transmission module, and the vehicle mounted key generation method comprises the following steps:

a step to send a secure access request: receiving, through the at least one ECU, a secure access request sent from an authorized user to it through a secure access device;

a step to wait for a key generation request: after confirming to accept the secure access request from the secure access device by the at least one ECU, waiting for the secure access device to send a key generation request;

a step to generate a key: generating a key through the key generation module in the at least one ECU after receiving the key generation request by the at least one ECU;

a step to send the key: using the key transmission module in the at least one ECU to send the key to other ECUs via the vehicle-mounted network.

In a preferred embodiment, each of the other ECUs comprises a key receiving module and a key invoking module, and the vehicle mounted key generation method further comprises the following steps after the key transmission step: a key receiving step: receiving the key through the key receiving module in the other ECUs; a key invoking step: the key invoking module in the other ECUs using the received key for computation and verification.

In a preferred embodiment, the at least one ECU further comprises a key encryption module, the other ECUs further comprise a key decryption module, and the vehicle mounted key generation method further comprises a key encryption step between the key generation step and the key transmission step: encrypting the key generated by the key generation module by the key encryption module; the vehicle mounted key generation method further comprises a key decryption step between the key receiving step and the key invoking step: decrypting the encrypted key received by the key receiving module through the key decryption module, wherein, in the key transmission step, the encrypted key is sent to the other ECUs via the vehicle-mounted network through the key transmission module in the at least one ECU; in the key receiving step, the encrypted key is received through the key receiving module in the other ECUs; in the key invoking step, the key invoking module in the other ECUs uses the decrypted key for computation and verification.

In a preferred embodiment, the at least one ECU further comprises a key storage module, and the key transmission step further performs the following processing: storing the key generated by the key generation module or the encrypted key encrypted by the key encryption module in the key storage module in the at least one ECU and no longer sending out the key or the encrypted key.

In a preferred embodiment, the at least one ECU further comprises a key invoking module, and the key invoking step further performs the following processing:
using the key generated by the key generation module or the key encrypted by the key encryption module for computation and verification through the key invoking module in the at least one ECU.

In a preferred embodiment, the other ECUs further comprise a key storage module, and the vehicle mounted key generation method further comprises a key storage step between the key receiving step and the key invoking step or between the key decryption step and the key invoking step: storing, by the key storage module in the other ECUs, the key received by the key receiving module or the key decrypted by the key decryption module and no longer sending out the stored key or the decrypted key.

In a preferred embodiment, the key generation module in the at least one ECU is in the locked mode before the at least one ECU confirms to accept a secure access request of the secure access device; in the key generation step, after the at least one ECU receives a key generation request sent by the secure access device, the key generation module is unlocked by the at least one ECU and switches to the key generation mode to generate the key according to the key generation request.

In a preferred embodiment, the key generated by the key generation module is a symmetric key.

In a preferred embodiment, the key is not encrypted when the key transmission module in the at least one ECU transmits the generated key via the vehicle-mounted network.

In a preferred embodiment, the secure access device is an unlocking device based on the inquiry/response mechanism.

In a preferred embodiment, the secure access device is a diagnostic/debugging tool at the manufacturer and/or repair shop of the vehicle.

In a preferred embodiment, the key generation module, the key storage module, the key encryption module, the key decryption module and the key invoking module are implemented as security hardware comprised in the corresponding ECUs; the key transmission module and the key receiving module are implemented as communication units comprised in the corresponding ECUs.

In a preferred embodiment, the security hardware is a hardware security module (HSM) or a security hardware extension (SHE); the communication unit is a transceiver used for the vehicle-mounted network.

According to the second aspect of the present disclosure, a vehicle using the vehicle mounted key generation method is provided, which comprises a plurality of electronic control units (ECUs) that communicate with each other via a vehicle-mounted network, wherein at least one ECU comprises a key generation module and a key transmission module, wherein the key generation module is used to generate a key based on the subsequently received key generation request sent by the secure access device, after the at least one ECU receives and confirms to accept a secure access request sent from an authorized user outside the vehicle to it through a secure access device, and the key transmission module is used to receive the key generated by the key generation module and send the key to other ECUs in the vehicle via the vehicle-mounted network.

In a preferred embodiment, each of the other ECUs comprises a key receiving module and a key invoking module, wherein the key receiving module is used to receive the key generated and sent by the at least one ECU via the vehicle-mounted network, and the key invoking module is used to use the received key for computation and verification.

In a preferred embodiment, the at least one ECU further comprises a key encryption module, used to encrypt the key generated by the key generation module; the other ECUs further comprise a key decryption module, used to decrypt the encrypted key received by the key receiving module, wherein, the key transmission module in the at least one ECU sends the encrypted key to the other ECUs via the vehicle-mounted network; the key receiving module in the other ECUs receives the encrypted key; the key invoking module in the other ECUs uses the decrypted key for computation and verification.

In a preferred embodiment, the at least one ECU further comprises a key storage module, which is used to store the key generated by the key generation module or the encrypted key encrypted by the key encryption module in the key storage module in the at least one ECU and no longer send out the key or the encrypted key.

In a preferred embodiment, the at least one ECU further comprises a key invoking module, which is used to use the key generated for computation and verification.

In a preferred embodiment, the other ECUs further comprise a key storage module, which is used to store the key received by the key receiving module or the key decrypted by the key decryption module and no longer send out the stored key or the decrypted key.

In a preferred embodiment, the key generation module in the at least one ECU is in the locked mode before the at least one ECU confirms to accept a secure access request of the secure access device; after the at least one ECU confirms to accept the secure access request sent by the secure access device and receives a key generation request subsequently sent by the secure access device, the key generation module is unlocked by the at least one ECU and switches to the key generation mode to generate the key according to the key generation request.

In a preferred embodiment, the key generated by the key generation module is a symmetric key.

In a preferred embodiment, the key is not encrypted when the key transmission module in the at least one ECU transmits the generated key via the vehicle-mounted network.

In a preferred embodiment, the secure access device is an unlocking device based on the inquiry/response mechanism.

In a preferred embodiment, the secure access device is a diagnostic/debugging tool at the manufacturer and/or repair shop of the vehicle.

In a preferred embodiment, the key generation module, the key storage module, the key encryption module, the key decryption module and the key invoking module are implemented as security hardware comprised in the corresponding ECUs; the key transmission module and the key receiving module are implemented as communication units comprised in the corresponding ECUs.

In a preferred embodiment, the security hardware is a hardware security module (HSM) or a security hardware extension (SHE); the communication unit is a transceiver used for the vehicle-mounted network.

According to the third aspect of the present disclosure, a computer-readable storage medium is provided, having a computer program stored thereon, which, when executed by a plurality of ECUs of a vehicle, implements the abovementioned vehicle mounted key generation method.

It should be understood that the content of the brief summary of the present disclosure is not intended to limit the key or important features of the embodiments of the present disclosure, nor is it intended to limit the scope of the present disclosure. Other features of the present disclosure will become easy to understand through the following description.

BRIEF DESCRIPTION OF THE DRAWINGS

With reference to the drawings and to the following detailed description, the above and other features, advantages and aspects of the embodiments of the present disclosure will become more apparent. In the drawings, the same or similar symbols indicate the same or similar elements. Specifically.

DETAILED DESCRIPTION

The embodiments of the present disclosure will be described in more detail below with reference to the drawings. Although some embodiments of the present disclosure are shown in the drawings, it should be understood that the present disclosure can be implemented in various forms and should not be construed as being limited to the embodiments herein. On the contrary, these embodiments are provided to facilitate understanding of the present disclosure more thoroughly and completely. In other words, the drawings and embodiments of the present disclosure are only for exemplary purposes and are not used to limit the scope of the present disclosure.

During vehicle inspection or regular maintenance, the inspection and maintenance are carried out by the maintenance personnel of authorized dealers or ordinary automobile repair shops, where the maintenance personnel access an ECU of a vehicle through diagnostic/debugging tools (i.e., secure access devices), download diagnostic trouble codes or other error codes, reprogram the ECU, or perform some other operations to deal with vehicle problems. It is important that, for security, only authorized users can use the unlocking devices based on the inquiry/response mechanism (i.e., diagnostic/debugging tools for maintenance personnel during vehicle inspection or regular maintenance) to successfully and safely access the ECUs on a vehicle to perform maintenance operations, otherwise unauthorized users may perform malicious or improper activities, which adversely affect the operation of the vehicle. In other words, it is important that unauthorized users cannot use the unlock devices based on the inquiry/response mechanism to successfully and safely access a vehicle's ECUs, so as to prevent them from using software that may be malicious or damage the vehicle to program the vehicle ECUs. In this regard, for example, ISO14229 defines the secure access service that allows the use of unlocking devices based on the inquiry/response mechanism, and Chinese Disclosure Patent Application CN103685214A also discloses a secure access method for electronic control units of automobiles. It can be determined that, after the maintenance personnel (i.e., authorized users) successfully access an ECU of a vehicle through the diagnostic/debugging tool of the maintenance equipment, the vehicle is deemed to be in a reliable and secure environment.

Similarly, in other environments that require secure access to vehicles, based on ISO14229 or, for example, a method of secure access to electronic control units of automobiles disclosed in Chinese Disclosure Patent Application CN103685214A, a vehicle is deemed to be in a reliable and secure environment after authorized users successfully and safely access the ECUs of the vehicle through a secure access device.

In the description of the embodiments of the present disclosure, the expressions "successful and secure access to the vehicle's ECUs" and "after the vehicle ECU confirms to accept the secure access request" should be understood to mean that the vehicle is placed in a reliable and secure environment by any means, and that the communication among the ECUs in the vehicle through the vehicle-mounted network (CAN) is in a safe state. "Comprising" and similar terms should be understood as open inclusion, i.e., "including but not limited to". The term "based on" should be understood as "at least partially based on". The term "according to" should be understood as "at least partially according to". The term "one embodiment" or "the embodiment" should be understood as "at least one embodiment". The following may also include other explicit and implicit definitions.

Some exemplary embodiments of the present disclosure will be described in more detail below with reference to FIGS. 1-4.

Figure 1:
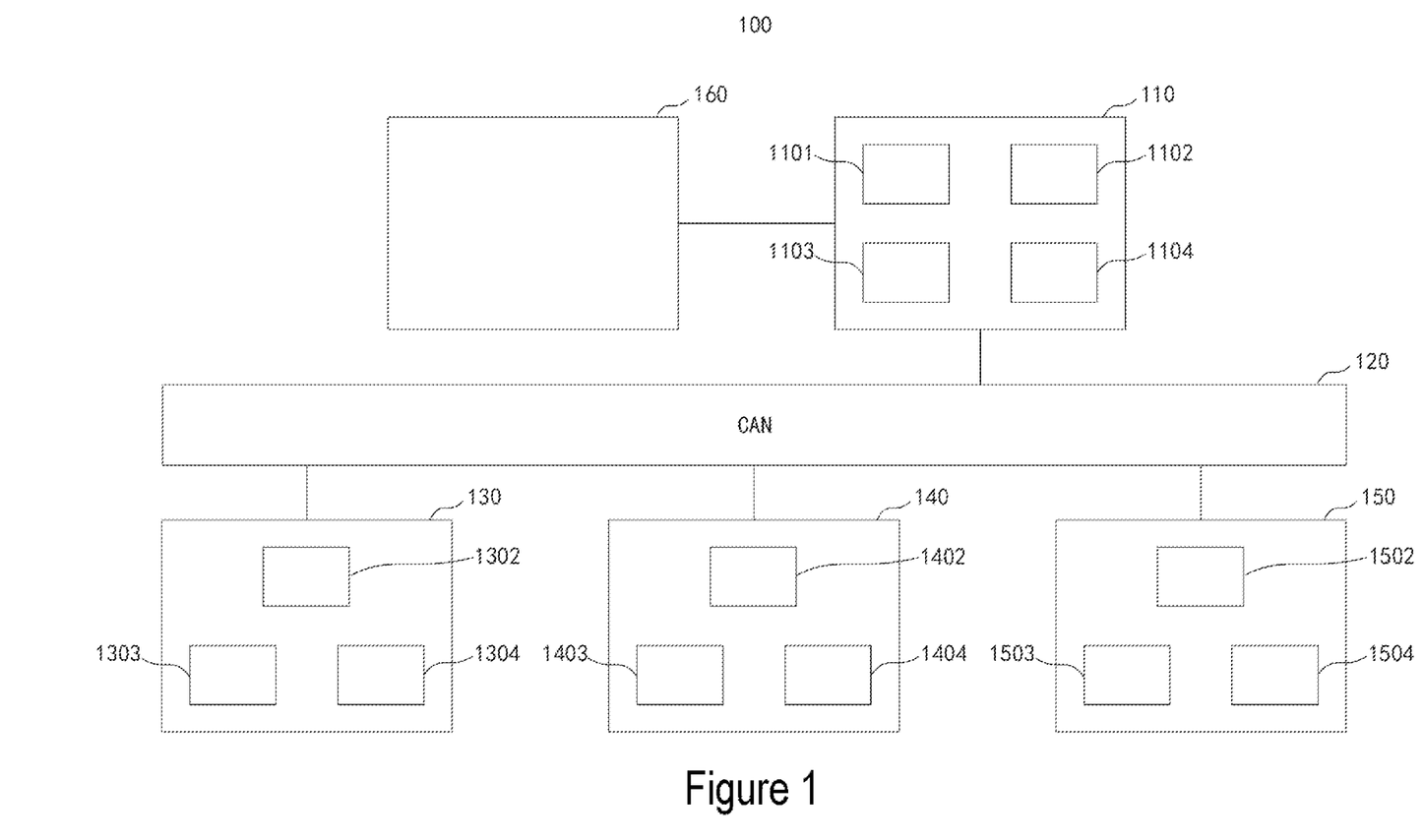
FIG. 1 is a structure diagram of a vehicle using the vehicle mounted key generation method according to the first embodiment of the present disclosure.

FIG. 1 shows a structure diagram of a vehicle using the vehicle mounted key generation method according to the first embodiment of the present disclosure. As it is shown, the exemplary environment 100 is, for example, a plurality of electronic control units (ECUs) in a vehicle that can communicate with each other via the control area network (CAN) in the vehicle. However, it should be understood that the environment shown in FIG. 1 is only an exemplary environment of the first embodiment of the present disclosure and is not used to limit the scope of the embodiments of the present disclosure. The present disclosure can also be applied to other network environments: for example, in-vehicle Ethernet, CAN FD, Flexray, etc.

In the exemplary environment 100 of the first embodiment, a plurality of ECUs of a vehicle, for example, ECU 110 and ECUs 130-150, are connected through a control area network (CAN) 120 in such a way that they can communicate with each other. Among them, ECU 110 comprises a key generation module 1101, a key transmission module 1102, a key storage module 1103, and a key invoking module 1104. ECUs 130-150 comprise respectively key receiving modules 1302, 1402 and 1502, key storage modules 1303, 1403 and 1503, and key invoking modules 1304, 1404 and 1504.

Among them, the key generation module 1101, each of the key storage modules 1103, 1303, 1403 and 1503 and each of the key invoking modules 1104, 1304, 1404 and 1504 can respectively be implemented as the security hardware, for example, hardware security modules (HSMs) or security hardware extensions (SHEs), in ECU 110 and ECUs 130-150; the key transmission module 1102 and the key receiving modules 1302, 1402 and 1502 can be implemented as the communication units, for example, transceivers used for CAN, in ECU 110 and ECUs 130-150. In another exemplary environment (not shown) of the first embodiment, ECU 110 may only comprise a key generation module and a key transmission module, but not a key storage module or a key invoking module.

In another exemplary environment (not shown) of the first embodiment, one or more of ECUs 130-150 may only comprise a key receiving module and a key invoking module, but not a key storage module.

In another exemplary environment (not shown) of the first embodiment, one or more of ECUs 130-150 may also comprise a key generation module and a key transmission module.

The process whereby a key is generated for each ECU of a vehicle and sent to other related ECUs is described below, taking ECU 110 as an example. It can be understood that a similar process may be adopted for any other ECU.

For example, when the manufacturer needs to generate a key for each of the ECUs of a vehicle during the production of vehicles by a vehicle manufacturer; or when the maintenance personnel need to change the key of an ECU of a vehicle during the maintenance of the vehicle by a vehicle repair shop; or in other cases where the key of a vehicle ECU needs to be updated, before an authorized user sends a secure access request to ECU 110 of the vehicle through the secure access device 160 (i.e., unlocking device based on the inquiry/response mechanism, for example, a diagnostic/debugging tool, etc.), the key generation module 1101 configured in ECU 110 is in the locked mode.

An authorized user sends a secure access request to ECU 110 of the vehicle through the secure access device 160. The secure access request is made based on, for example, the secure access service specified in ISO14229 or a secure access method disclosed in prior art (for example, Chinese Disclosure Patent Application CN103685214A).

ECU 110 waits for a key generation request subsequently sent by the secure access device 160 after it confirms to accept the secure access request of the secure access device 160 (i.e., the secure access device 160 successfully and safely accesses ECU 110) based on, for example, the secure access service specified in ISO14229 or a secure access method disclosed in prior art (for example, Chinese Disclosure Patent Application CN103685214A).

After ECU 110 receives a key generation request sent by the secure access device 160, ECU 110 unlocks the key generation module 1101 configured in it accordingly so that it enters the key generation mode; the key generation module 1101 generates a key according to the key generation request, and when ECU 110 needs to use the generated key, the generated key is stored in the key storage module 1103 and no longer sent out. The key can be a symmetric key or an asymmetric key.

The key transmission module 1102 configured in ECU 110 receives the key generated by the key generation module 1101, and sends the generated key to other related ECUs in the vehicle, for example ECUs 130-150, via the vehicle-mounted network (CAN) 120 without encryption.

After the key receiving modules 1302, 1402, 1502 in ECUs 130-150 receive the key sent by the key transmission module 1102 configured in ECU 110, the key is stored in the key storage modules 1303, 1403 and 1503 and is no longer sent out.

The key invoking module 1104 in ECU 110 can directly use the key generated by the key generation module 1101 for computation and verification, and the key invoking modules 1304, 1404, and 1504 in ECUs 130-150 use the received key for computation and verification. The computation and verification are, for example, encrypted transmission of a request of the ADAS for the vehicle to the vehicle control system or an ECU software package in the vehicle, etc.

A modification of the first embodiment further comprises performing the following processing:

after the key is received by the key receiving modules 1302, 1402 and 1502 in each of ECUs 130-150, each of the key receiving modules 1302, 14102 and 1502 respectively sends a feedback signal to the key transmission module 1102 in ECU 110;

then, ECU 110 notifies the secure access device 160 through the key transmission module 1102 that: ECU 110 has generated the key and each of ECUs 130-150 has received the key;

then, ECU 110 waits for the secure access device 160 to send a new key generation request;

if the secure access device 160 sends a new key generation request within a predetermined time (for example, 60 s), the key generation module 1101 in ECU 110 regenerates a new key; or if the security access device 160 sends a key generation exit request within a predetermined time (for example, 30 s), the key generation module 1101 in ECU 110 exits the key generation mode and enters the locked mode; or if ECU 110 does not receive any new key generation request from the secure access device 160 within a predetermined time (for example, 60 s), the key generation module 1101 in ECU 110 exits the key generation mode and enters the locked mode.

Through the solution of the first embodiment of the present disclosure, it is possible to flexibly and conveniently configure an independent key generation module to generate a key for one or more ECUs of a vehicle and configure an independent key transmission module to send the generated key to other related ECUs in the vehicle. Because the key generation module in the ECU will be unlocked from the locked mode and enter the key generation mode to generate a key only when the vehicle is in a reliable and secure environment (for example, the vehicle's ECU accepts a security access request to the vehicle from a secure access device), there is no need to encrypt the key when the key transmission module sends the key.

Through the solution of the first embodiment of the present disclosure, during the vehicle production stage at a vehicle manufacturer, the production personnel (i.e., authorized users) of the vehicle manufacturer can use a diagnosis/debugging tool (i.e., secure access device) to access an ECU of the vehicle in order to send a secure access request and a key generation request, so that the accessed ECU can generate the required key, and the vehicle manufacturer does not need to configure an expensive server to generate the keys for vehicle ECUs.

Through the solution of the first embodiment of the present disclosure, inspection or regular maintenance of a vehicle is carried out by the maintenance personnel (i.e., authorized users) of an authorized dealer or an ordinary car repair shop, where the maintenance personnel access an ECU of the vehicle through a diagnostic/debugging tool (i.e., secure access device) to send a secure access request and a key generation request, so that the ECU can generate a new key and send the new key to other related ECUs via the vehicle-mounted network in order for these ECUs to work in coordination, and the maintenance personnel do not need to connect to the vehicle manufacturer's server during vehicle maintenance and it is no longer necessary to replace the complete set of associated ECUs when repairing or replacing one or more ECUs, thus avoiding unreasonably high vehicle maintenance costs.

Figure 2:
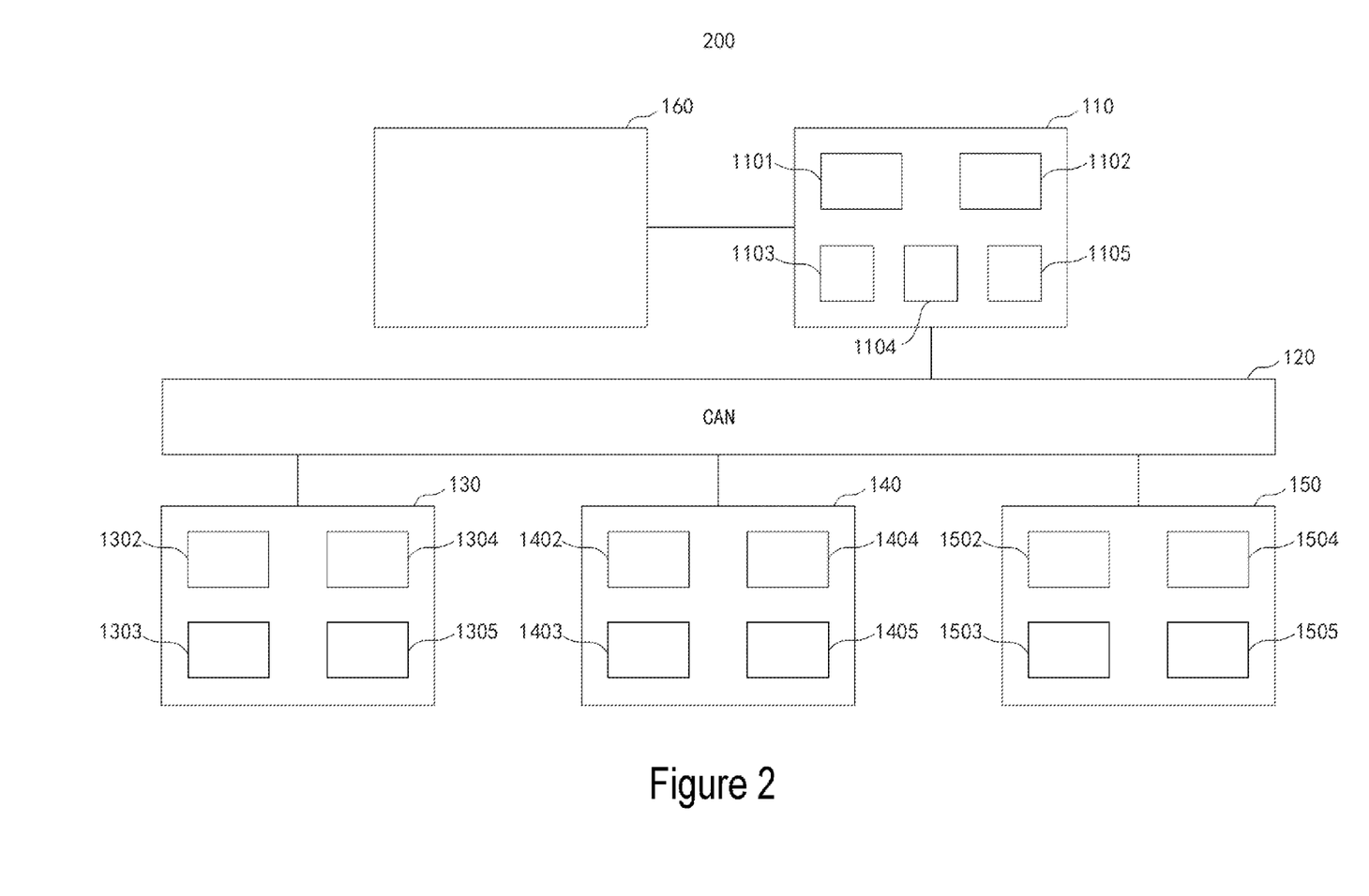
FIG. 2 is a structure diagram of a vehicle using the vehicle mounted key generation method according to the second embodiment of the present disclosure.

FIG. 2 shows a structure diagram of a vehicle using the vehicle mounted key generation method according to the second embodiment of the present disclosure. The exemplary environment 200 is, for example, multiple electronic control units (ECUs) in a vehicle that can communicate with each other via the control area network (CAN) in the vehicle. However, it should be understood that the environment shown in FIG. 2 is only an exemplary environment of the second embodiment of the present disclosure and is not used to limit the scope of the embodiments of the present disclosure. The present disclosure can also be applied to other network environments: for example, in-vehicle Ethernet, CAN FD, Flexray, etc.

The second embodiment shown in FIG. 2 differs from the first embodiment shown in FIG. 1 only in that: in the vehicle using the vehicle mounted key generation method of the second embodiment, ECU 110 further comprises a key encryption module 1105, and ECUs 130-150 further comprise respectively key decryption modules 1305, 1405 and 1505. The key generation module 1101 configured in ECU 110 generates a key and sends it to the key encryption module 1105 for encryption, and then the key transmission module 1102 sends the encrypted key to other related ECUs in the vehicle, for example, ECUs 130-150, via the vehicle-mounted network (CAN) 120. After the key receiving modules 1302, 1402 and 1502 in each of ECUs 130-150 receive the encrypted key, it is sent to the key decryption modules 1305, 1405 and 1505 in each of ECUs 130-150 for decryption, and then the decrypted key is sent to the key storage modules 1303, 1403 and 1503 for storage, and sent to the key invoking modules 1304, 1404 and 1504 in each of ECUs 130-150 that use it for computation and verification. Moreover, the key invoking module 1104 in ECU 110 can also directly use the key generated by the key generation module 1101 for computation and verification. The computation and verification are, for example, encrypted transmission of a request of the ADAS for the vehicle to the vehicle control system or an ECU software package in the vehicle, etc.

Specifically, the key encryption module 1105 and the key decryption modules 1305, 1405, and 1505 can be respectively implemented as security hardware, for example, hardware security modules (HSMs) or security hardware extensions (SHEs), comprised in ECU 110 and ECUs 130-150.

In the second embodiment shown in FIG. 2, since the generated key is encrypted and then sent, the security of key transmission is further improved.

Figure 3:
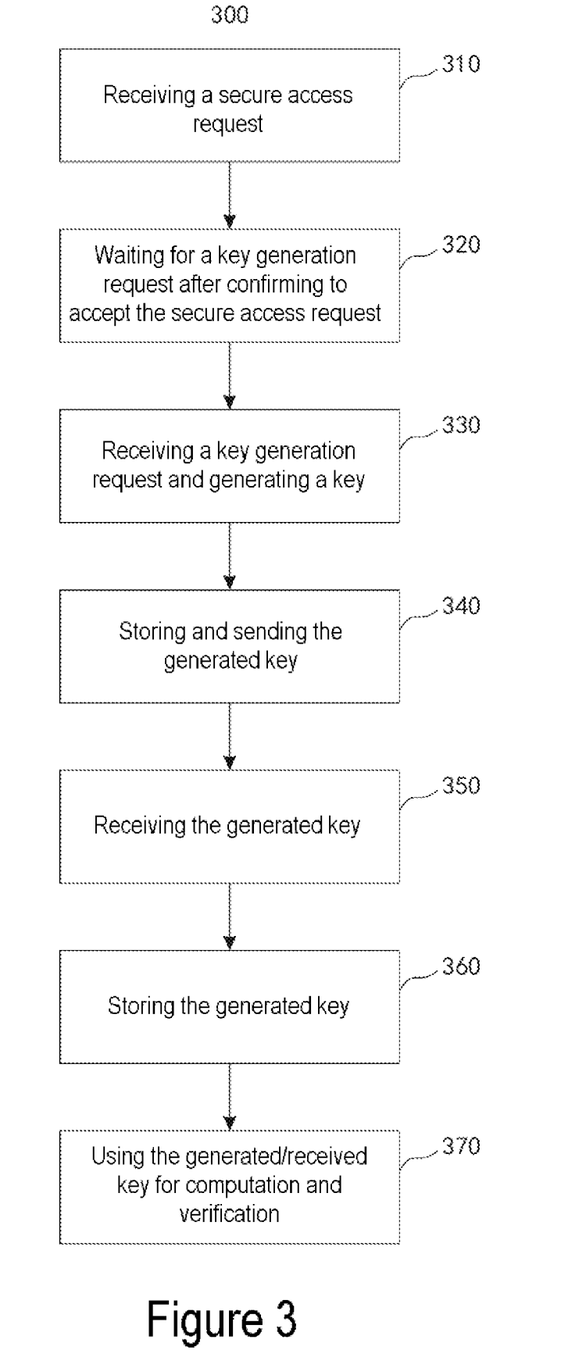
FIG. 3 is a flowchart of the vehicle mounted key generation method for vehicles according to the first embodiment of the present disclosure.

FIG. 3 shows a flowchart of the vehicle mounted key generation method 300 for vehicles according to the first embodiment of the present disclosure. The exemplary environment 100 is, for example, multiple electronic control units (ECUs) in a vehicle that can communicate with each other via the control area network (CAN) in the vehicle. However, it should be understood that the environment shown in FIG. 3 is only an exemplary environment of the first embodiment of the present disclosure and is not used to limit the scope of the embodiments of the present disclosure. The present disclosure can also be applied to other network environments: for example, in-vehicle Ethernet, CAN FD, Flexray, etc.

In the exemplary environment 100, a plurality of ECUs of a vehicle, for example, ECU 110 and ECUs 130-150, are connected through a control area network (CAN) 120 in such a way that they can communicate with each other. Among them, ECU 110 comprises a key generation module 1101, a key transmission module 1102, a key storage module 1103, and a key invoking module 1104. ECUs 130-150 comprise respectively key receiving modules 1302, 1402 and 1502, key storage modules 1303, 1403 and 1503, and key invoking modules 1304, 1404 and 1504.

Among them, the key generation module 1101, each of the key storage modules 1103, 1303, 1403 and 1503 and each of the key invoking modules 1104, 1304, 1404 and 1504 can respectively be implemented as security hardware, for example, hardware security modules (HSMs) or security hardware extensions (SHEs), in ECU 110 and ECUs 130-150, and the key transmission module 1102 and the key receiving modules 1302, 1402 and 1502 can be implemented as communication units, for example, transceivers used for CAN, in ECU 110 and ECUs 130-150.

Taking ECU 110 for example, the vehicle mounted key generation method 300 is briefly described below, whereby each of the ECUs of the vehicle generates a key and sends it to other related ECUs when, for example, the manufacturer needs to generate a key for each of the ECUs of a vehicle during the production of vehicles by a vehicle manufacturer; or when the maintenance personnel need to change the key of an ECU of a vehicle during the maintenance of the vehicle by a vehicle repair shop; or in other cases where the key of a vehicle ECU needs to be updated. It can be understood that a similar process may be adopted for any other ECU. The vehicle mounted key generation method 300 comprises the following steps:

Step 310: ECU 110 of a vehicle receives a secure access request sent to it by an authorization user (for example, the production personnel of the vehicle manufacturer or the maintenance personnel of a vehicle repair shop) through the secure access device 160 (i.e., unlocking device based on the inquiry/response mechanism, for example, a diagnostic/debugging tool, etc.), before which the key generation module 1101 configured in ECU 110 is in the locked mode, wherein the secure access request is made based on, for example, the secure access service specified in ISO14229 or a secure access method disclosed in prior art (for example, Chinese Disclosure Patent Application CN103685214A).

Step 320: ECU 110 waits for a key generation request subsequently sent by the secure access device 160 after it confirms to accept the secure access request of the secure access device 160 (i.e., the secure access device 160 successfully and safely accesses ECU 110) based on, for example, the secure access service specified in ISO14229 or a secure access method disclosed in prior art (for example, Chinese Disclosure Patent Application CN103685214A).

Step 330: after ECU 110 receives a key generation request sent by the secure access device 160, ECU 110 unlocks the key generation module 1101 configured in it accordingly so that it switches from the locked mode to the key generation mode, and the key generation module 1101 generates a key according to the key generation request. The key can be a symmetric key or an asymmetric key.

Step 340: the key transmission module 1102 receives the key generated by the key generation module 1101, and sends the generated key to other related ECUs in the vehicle, for example ECUs 130-150, via the vehicle-mounted network (CAN) 120 without encryption, and the generated key is stored in the key storage module 1103 and is no longer sent out when ECU 110 needs to use the generated key.

Step 350: the key receiving modules 1302, 1402 and 1502 in each of ECUs 130-150 receive the key sent by the key transmission module 1102.

Step 360: the key receiving modules 1302, 1402 and 1502 in each of ECUs 130-150 store the received key in the key storage modules 1303, 1403 and 1503 and no longer send it out.

Step 370: the key invoking module 1104 in ECU 110 uses the key generated for computation and verification, and the key invoking modules 1304, 1404, and 1504 in ECUs 130-150 use the received key for computation and verification. The computation and verification are, for example, encrypted transmission of a request of the ADAS for the vehicle to the vehicle control system or an ECU software package in the vehicle, etc.

In another exemplary environment (not shown) of the first embodiment, ECU 110 may only comprise a key generation module and a key transmission module, but not a key storage module or a key invoking module, and step 340 does not comprise storing the generated key in the key storage module 1103 and no longer sending it out; step 370 does not comprise the key invoking module 1104 in ECU 110 using the generated key for computation and verification.

In another exemplary environment (not shown) of the first embodiment, one or more of ECUs 130-150 may only comprise a key receiving module and a key invoking module, but not a key storage module, and the vehicle mounted key generation method does not comprise step 360.

In another exemplary environment (not shown) of the first embodiment, one or more of ECUs 130-150 may also comprise a key generation module and a key transmission module, and one or more ECUs 130-150 can perform steps 310-340 where needed in an application scenario.

Through the method 300 of the first embodiment of the present disclosure, it is possible to flexibly and conveniently configure an independent key generation module to generate a key for each of the ECUs of a vehicle and configure an independent key transmission/receiving module to send the generated key to other related ECUs in the vehicle. Because the key generation module will be unlocked from the locked mode and enter the key generation mode to generate a key only when the vehicle is in a reliable and secure environment (for example, the vehicle's ECU confirms to accept a secure access request to the vehicle from a secure access device) and after it receives a key generation request sent by a secure access device, there is no need to encrypt the key when the key transmission/receiving module sends the key.

Through the method 300 of the first embodiment of the present disclosure, during the vehicle production stage at a vehicle manufacturer, the production personnel (i.e., users) of the vehicle manufacturer can use a diagnosis/debugging tool (i.e., secure access device) to access an ECU of the vehicle in order to send a secure access request and a key generation request, so that each ECU can generate the required key, and the vehicle manufacturer does not need to configure an expensive server to generate the keys for vehicle ECUs.

Through the method 300 of the first embodiment of the present disclosure, inspection or regular maintenance of a vehicle is carried out by the maintenance personnel (i.e., users) of an authorized dealer or an ordinary car repair shop, where the maintenance personnel access an ECU of the vehicle through a diagnostic/debugging tool (i.e., secure access device) to send a secure access request and a key generation request, so that the ECU can generate a new key and send the new key to other related ECUs via the vehicle-mounted network in order for these ECUs to work in coordination, and the maintenance personnel do not need to connect to the vehicle manufacturer's server during vehicle maintenance and it is no longer necessary to replace the complete set of associated ECUs when repairing or replacing one or more ECUs, thus avoiding unreasonably high vehicle maintenance costs.

Figure 4:
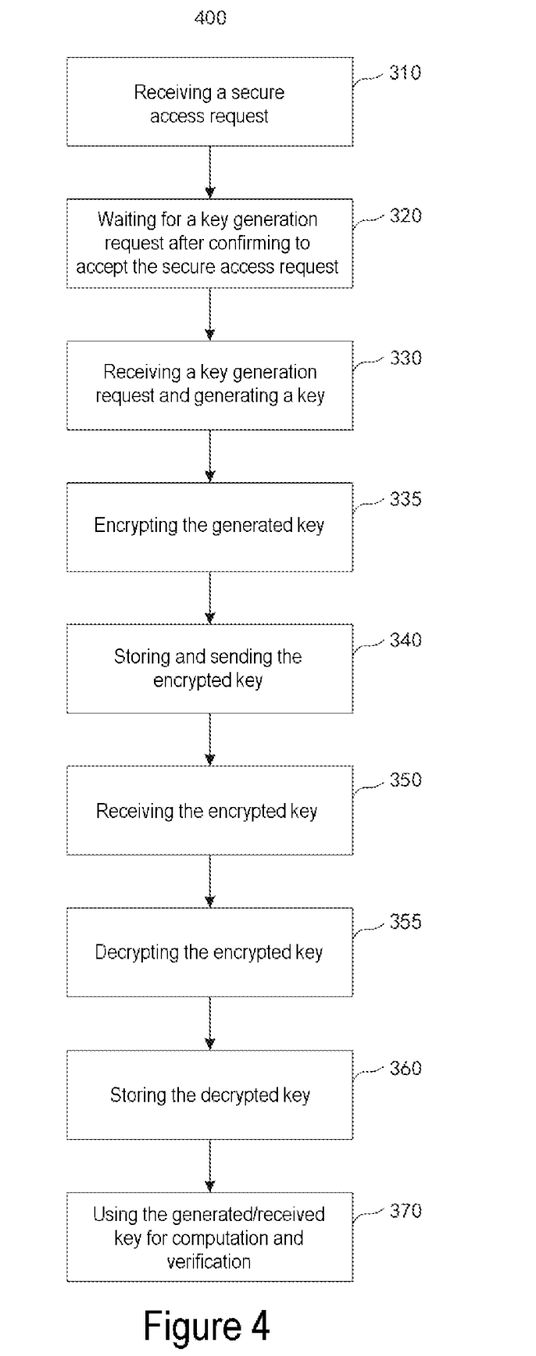
FIG. 4 is a flowchart of the vehicle mounted key generation method for vehicles according to the second embodiment of the present disclosure.

FIG. 4 shows a flowchart of the vehicle mounted key generation method 400 for vehicles according to the second embodiment of the present disclosure. The exemplary environment 200 is, for example, multiple electronic control units (ECUs) in a vehicle that can communicate with each other via the control area network (CAN) in the vehicle. However, it should be understood that the environment shown in FIG. 2 is only an exemplary environment of the embodiments of the present disclosure and is not used to limit the scope of the embodiments of the present disclosure. The present disclosure can also be applied to other network environments: for example, in-vehicle Ethernet, CAN FD, Flexray, etc.

The second embodiment shown in FIG. 4 differs from the first embodiment shown in FIG. 3 in that: in the vehicle using the vehicle mounted key generation method 400 of the second embodiment, ECU 110 further comprises a key encryption module 1105, and ECUs 130-150 further comprise respectively key decryption modules 1305, 1405 and 1505.

Compared with the method 300 of the first embodiment, the vehicle mounted key generation method 400 of the second embodiment further comprises the following steps:
step 335 between step 330 and step 340: the key generation module 1101 configured in ECU 110 generates a key and sends it to the key encryption module 1105 for encryption;
step 355 between step 350 and step 360: the key decryption modules 1305, 1405, and 1505 in each of ECUs 130-150 respectively decrypt the encrypted key received by each of the key receiving modules 1302, 1402 and 1502.

Specifically, in step 340, the key storage module 1103 stores the encrypted key, and the key transmission module 1102 sends the encrypted key to other related ECUs in the vehicle, for example, ECUs 130-150, via the vehicle-mounted network (CAN) 120.

In step 350, the key receiving modules 1302, 1402 and 1502 in each of ECUs 130-150 receive the encrypted key.

In step 360, the key storage modules 1303, 1403 and 1503 in each of ECUs 130-150 store the decrypted key and no longer send it out.

In step 370, the key invoking module 1104 in ECU 110 uses the key generated for computation and verification, and the key invoking modules 1304, 1404, and 1504 in ECUs 130-150 use the decrypted key for computation and verification. The computation and verification are, for example, encrypted transmission of a request of the ADAS for the vehicle to the vehicle control system or an ECU software package in the vehicle, etc.

Specifically, the key encryption module 1105 and the key decryption modules 1305, 1405, and 1505 can be respectively implemented as security hardware, for example, hardware security modules (HSMs) or security hardware extensions (SHEs), comprised in ECU 110 and ECUs 130-150.

In the second embodiment shown in FIG. 4, since the generated key is encrypted and then sent, the security of key transmission is further improved.

The methods of the present disclosure (for example, method 300 according to the first embodiment shown in FIG. 3 and method 400 according to the second embodiment shown in FIG. 4) may be implemented by a program code programmed by a computer, and the program code may be written in one or any combination of multiple programming languages. These program codes can be provided to the processors or controllers of general-purpose computers, special-purpose computers or other programmable data processing devices, so that, when the program codes are executed by the processors or controllers, the functions/operations specified in the flowcharts and/or block diagrams are implemented.

The program code for implementing the methods of the present disclosure (for example, method 300 according to the first embodiment shown in FIG. 3 and method 400 according to the second embodiment shown in FIG. 4) may be stored in a computer-readable storage medium. In the context of the present disclosure, a computer-readable storage medium may be a physical medium, which may contain or store programs to be used by or in combination with an instruction execution system, apparatus, or device. The computer-readable storage medium may be a computer-readable signal medium or a computer-readable storage medium. The computer-readable medium may comprise, but is not limited to, electronic, magnetic, optical, electromagnetic, infrared, or semiconductor systems, apparatuses or devices, or any suitable combination of the above. More specific examples of the computer-readable storage medium would include electrical connections based on one or more wires, portable computer disks, hard disks, random access memory (RAM), read-only memory (ROM), erasable programmable read-only memory (EPROM or flash memory), optical fibers, compact disk read-only memory (CD-ROM), optical storage devices, magnetic storage devices, or any suitable combination of the above.

In addition, although the actions or steps in the various embodiments above are described in a specific order, this should be understood as requiring such actions or steps to be performed in the specific order or sequence shown, or requiring all illustrated actions or steps to be performed to achieve the desired results. Under certain circumstances, multitasking and parallel processing may be advantageous. Similarly, although several specific implementation details are included in the above discussion, these should not be construed as limiting the scope of the present disclosure. Certain features described in the context of an individual embodiment may also be implemented in combination in a single implementation. Conversely, the various features described in the context of an individual embodiment may also be implemented as suitable sub-combinations in a single implementation.

Obviously, as shown in the embodiments of the present disclosure, it can be seen that the technical solution of the present disclosure has achieved the following beneficial technical effects:
(1) vehicle manufacturers do not need to configure expensive servers and the keys required for each ECU may be generated through the implementation of the vehicle key generation method of the present disclosure during the vehicle production stage;
(2) in the absence of the conditions for connecting to the vehicle manufacturer's server or poor communication with the vehicle manufacturer's server, it is possible to flexibly update keys in a timely manner;
(3) during the maintenance of a vehicle at the repair shop, when one or more ECUs need to be replaced, the repair shop no longer needs to replace the full set of the associated ECUs, thus avoiding unreasonably high vehicle repair costs;
(4) the key exchanged among the ECUs of a vehicle no longer needs to be encrypted, thus reducing the cost and complexity of key exchange.

The above only discloses and describes exemplary embodiments of the present disclosure. Those skilled in the art of the present disclosure will easily understand, from the discussion, the drawings and the claims, that various changes, transformations and modifications may be made without departing from the motivation and scope of the present disclosure defined by the following claims.

What is claimed is:

1. A vehicle-mounted key-generation method used for a vehicle, the vehicle comprising a plurality of electronic control units (ECUs) that communicate with each other through a vehicle-mounted network, at least one ECU of the plurality of ECUs including a key generation module and a key transmission module, the method comprising:
receiving, with the at least one ECU, while the key generation module in the at least one ECU is in a locked mode, a secure access request sent from an authorized user outside the vehicle to the vehicle through a secure access device and confirming to accept the secure access request;
waiting for the secure access device to send a key generation request after confirming to accept the secure access request from the secure access device by the at least one ECU, the key generation module in the at least one ECU being unlocked and switched to a key generation mode in response to receiving the key generation request;
generating, after the key generation module in the at least one ECU being unlocked and switched to the key generation mode, a key using the key generation module in the at least one ECU; and
sending the key to other ECUs of the plurality of ECUs via the vehicle-mounted network using the key transmission module in the at least one ECU.

2. The vehicle-mounted key-generation method according to claim 1, wherein each of the other ECUs comprises a key receiving module and a key invoking module, the method further comprising:
receiving the sent key through the corresponding key receiving modules in the other ECUs; and
using the received key for computation and verification through the corresponding key invoking modules in the other ECUs.

3. The vehicle-mounted key-generation method according to claim 2, wherein the at least one ECU further comprises a key encryption module, and the other ECUs further comprise a key decryption module, the method further comprising:
encrypting the key generated using the key generation module with the key encryption module before sending the key; and
decrypting the encrypted key using the key decryption module before using the received key,
wherein the key transmission module in the at least one ECU is used to send the encrypted key to the other ECUs via the vehicle-mounted network,
wherein the corresponding key receiving modules in the other ECUs are used to receive the encrypted key, and
wherein the decrypted key is used for computation and verification through the corresponding key invoking modules in the other ECUs.

4. The vehicle-mounted key-generation method according to claim 3, wherein the at least one ECU further comprises a key storage module, and sending the key to the other ECUs comprises:
storing, using the key storage module in the at least one ECU, the encrypted key and no longer sending out the encrypted key.

5. The vehicle-mounted key-generation method according to claim 2, wherein the at least one ECU further comprises a key invoking module, and using the received key comprises:
using the key generated by the key generation module for computation and verification through the key invoking module in the at least one ECU.

6. The vehicle-mounted key-generation method according to claim 3, wherein the other ECUs further comprise a key storage module, the method further comprising:
storing, using the key storage module in the other ECUs, the decrypted key and no longer sending out the decrypted key.

7. The vehicle-mounted key-generation method according to claim 1, wherein the key generated by the key generation module is a symmetric key.

8. The vehicle-mounted key-generation method according to claim 1, wherein the key is not encrypted when the key transmission module in the at least one ECU transmits the generated key via the vehicle-mounted network.

9. The vehicle-mounted key-generation method according to claim 1, wherein:
the secure access device is an unlocking device based on an inquiry/response mechanism, and
the secure access device is a diagnostic/debugging tool at a manufacturer and/or repair shop of the vehicle.

10. The vehicle-mounted key-generation method according to claim 4, wherein:
the key generation module, the key storage module, the key encryption module, the key decryption module, and the key invoking module are implemented as security hardware comprised in the corresponding ECUs;
the key transmission module and the key receiving module are implemented as communication units comprised in the corresponding ECUs;
the security hardware is a hardware security module or a security hardware extension; and
the communication unit is a transceiver used for the vehicle-mounted network.

11. A vehicle comprising:
a plurality of electronic control units (ECUs) configured to communicate with each other via a vehicle-mounted network, at least one ECU of the plurality of ECUs including a key generation module and a key transmission module,
wherein the at least one ECU is configured to:
receive, while the key generation module in the at least one ECU is in a locked mode, a secure access request sent from an authorized user outside the vehicle to the vehicle through a secure access device and confirming to accept the secure access request;
wait for the secure access device to send a key generation request after confirming to accept the secure access request from the secure access device, the key generation module in the at least one ECU being unlocked and switched to a key generation mode in response to receiving the key generation request;
generate, after the key generation module in the at least one ECU being unlocked and switched to the key generation mode, a key using the key generation module in the at least one ECU; and
send the key to other ECUs of the plurality of ECUs via the vehicle-mounted network using the key transmission module.

12. The vehicle according to claim 11, wherein:
each of the other ECUs comprises a key receiving module and a key invoking module,
the at least one ECU further comprises a key encryption module configured to encrypt the key generated by the key generation module,
the other ECUs further comprise a key decryption module configured to decrypt the encrypted key received by the key receiving module,
the key transmission module in the at least one ECU is configured to send the encrypted key to the other ECUs via the vehicle-mounted network,
the key receiving module in the other ECUs is configured to receive the encrypted key, and
the key invoking module in the other ECUs is configured to use the decrypted key for computation and verification.

13. The vehicle according to claim 12, wherein the at least one ECU further comprises a key storage module configured to store the encrypted key encrypted by the key encryption module and no longer send out the encrypted key.

14. The vehicle according to claim 11, wherein the at least one ECU further comprises a key invoking module configured to use the key generated for computation and verification.

15. The vehicle according to claim 12, wherein the other ECUs further comprise a key storage module configured to store the decrypted key and no longer to send out the decrypted key.

16. The vehicle according to claim 11, wherein:
the secure access device is an unlocking device based on the inquiry/response mechanism, and
the secure access device is a diagnostic/debugging tool at the manufacturer and/or repair shop of the vehicle.

17. The vehicle according to claim 12, wherein:
the key generation module, the key storage module, the key encryption module, the key decryption module and the key invoking module are implemented as security hardware comprised in the corresponding ECUs; and
the key transmission module and the key receiving module are implemented as communication units comprised in the corresponding ECUs.

18. A non-transitory computer-readable storage medium, having a computer program stored thereon, which, when executed by a plurality of ECUs of a vehicle, implements a vehicle-mounted key-generation method comprising:
receiving, with at least one ECU of the vehicle, while a key generation module in the at least one ECU is in a locked mode, a secure access request sent from an authorized user outside the vehicle to the vehicle through a secure access device and confirming to accept the secure access request;
waiting for the secure access device to send a key generation request after confirming to accept the secure access request from the secure access device by the at least one ECU, the key generation module in the at least one ECU being unlocked and switched to a key generation mode in response to receiving the key generation request;
generating, after the key generation module in the at least one ECU being unlocked and switched to the key generation mode, a key using a key generation module in the at least one ECU; and
sending the key to other ECUs of the vehicle via the vehicle-mounted network using a key transmission module in the at least one ECU.

* * * * *